United States Patent [19]
Neff

[11] 4,271,868
[45] Jun. 9, 1981

[54] PILOT OPERATED PILOT VALVE
[75] Inventor: James A. Neff, Bloomfield Township, Oakland County, Mich.
[73] Assignee: Mac Valves, Inc., Wixom, Mich.
[21] Appl. No.: 13,472
[22] Filed: Feb. 21, 1979
[51] Int. Cl.³ .......................................... F15B 13/043
[52] U.S. Cl. .............................. 137/625.64; 137/625.6
[58] Field of Search ............. 137/625.5, 625.6, 625.64; 251/DIG. 1

[56] References Cited
U.S. PATENT DOCUMENTS

| | | | |
|---|---|---|---|
| 2,965,132 | 12/1960 | Couffer et al. | 137/625.64 |
| 3,329,165 | 7/1967 | Lang | 251/129 X |
| 3,538,954 | 11/1970 | Fagerlie et al. | 251/129 X |
| 3,768,517 | 10/1973 | Pauliukonis | 137/625.65 |
| 3,916,952 | 11/1975 | Pauliukonis | 137/625.64 |
| 4,150,695 | 4/1979 | Kosugui | 137/625.64 |

Primary Examiner—Gerald A. Michalsky
Attorney, Agent, or Firm—Robert G. Mentag

[57] ABSTRACT

A pilot operated pilot valve which is adapted to employ a low wattage solenoid for operation of the pilot valve which functions as an amplifier to control or drive various types of larger air valves, such as a four-way valve, a three-way valve, a two-way valve and the like. The pilot valve includes a valve body with an inlet port, an exhaust port, and a cylinder port for directing pilot air to a valve to be controlled. A poppet spool valve is mounted in the valve body to control the flow of air between said ports. The poppet spool valve is biased to an inoperative position, by a return spring and by a pilot air assist return action, so as to block flow between the inlet port and the cylinder port but allow flow between the cylinder port and the exhaust port. A low wattage solenoid blocks an exhaust passageway system when it is de-energized to allow the return spring and pilot air to hold the poppet valve in an inoperative position. When the low wattage solenoid is energized, the last mentioned exhaust passageway system is closed and pilot air is then allowed to flow through an orifice in the top of the poppet spool valve into a chamber above the poppet spool valve and react against the effective top end area thereof, and move the poppet spool valve to an operative position to open a passageway between the inlet port and the cylinder port and block off any flow to the exhaust port.

8 Claims, 10 Drawing Figures

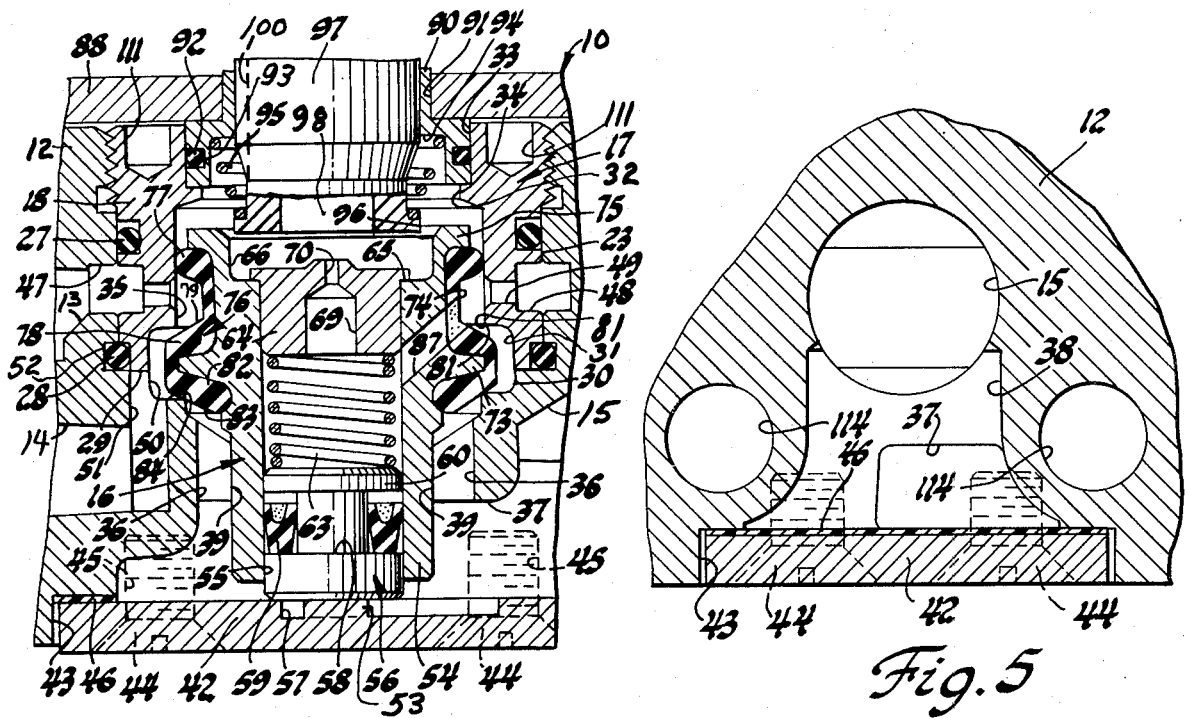
Fig. 3
Fig. 5
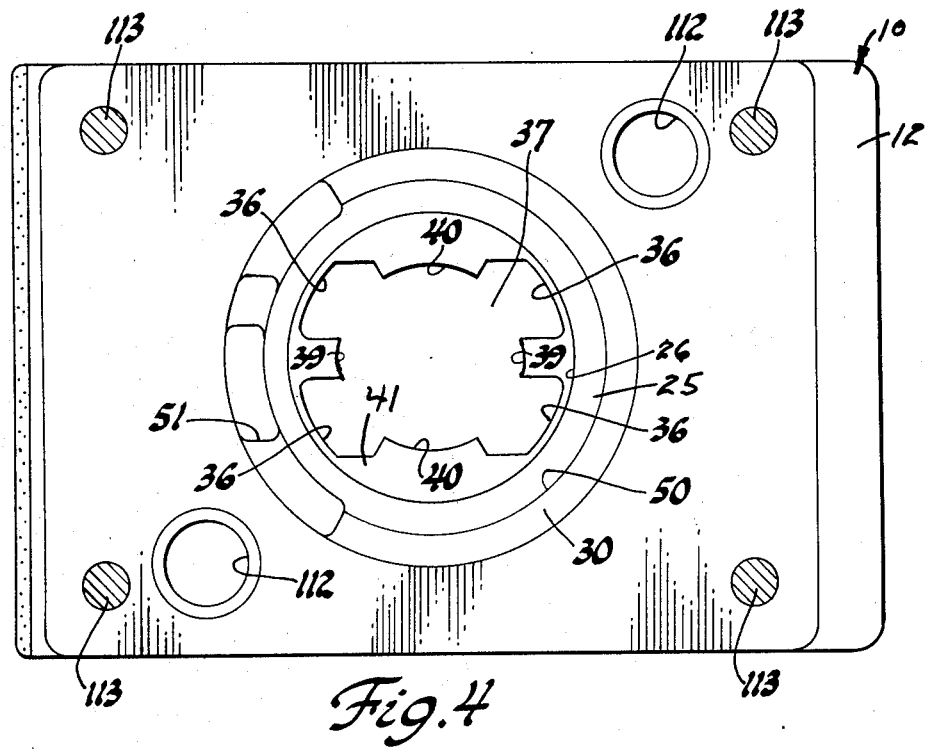
Fig. 4

PILOT OPERATED PILOT VALVE

BACKGROUND OF THE INVENTION

1. Field of the Invention

This invention relates generally to air valves, and more particularly to a solenoid controlled, pilot air operated pilot valve which functions as an amplifier for use in controlling a larger air valve such as a four-way valve, a three-way valve, a two-way valve or the like.

2. Description of the Prior Art

It is well known in the air valve art to provide pilot valves for operating four-way valves, three-way valves, two-way valves and the like. It is also known in the valve art, to provide solenoid controlled pilot air valves. However, a problem encountered in the prior art solenoid controlled valves is that the prior art pilot valves require high wattage solenoids for operating the same. It is also known that low wattage solenoids are available, but they are not capable of operating conventional pilot air valves.

SUMMARY OF THE INVENTION

In accordance with the present invention, the valve body is provided with an inlet port for connection to the main air source of an air valve to be controlled, such as a four-way valve, a three-way valve, a two-way valve or the like. The valve body is also provided with a cylinder port for connection to the valve to be controlled. The valve body is also provided with an exhaust port, and passageway means for interconnecting the inlet port with the cylinder port, and alternatively, the cylinder port with the exhaust port. A poppet spool valve is movably mounted in the valve body for movement between an inoperative and an operative position for controlling the flow of air between said ports. The poppet spool valve is provided with a molded spool construction which engages a first valve seat when the poppet spool valve is in an inoperative position, and a second valve seat when the poppet spool valve is in an operative position. The poppet spool valve is moved to the inoperative position by a return spring means with a pilot air return assist action. The poppet spool valve is moved to an operative position by the pilot air which is controlled by the action of a low wattage solenoid pilot valve. The low wattage solenoid functions as a three-way valve, to block the pilot air in the poppet spool valve when it is in the inoperative position, and to allow the pilot air to flow through an orifice in the top end of the poppet spool valve when the solenoid is energized into a chamber above the poppet spool valve and move it downwardly to an operative position to connect the inlet port with the cylinder port, and block flow to the exhaust port.

BRIEF DESCRIPTION OF THE DRAWINGS

FIG. 3 is a fragmentary, elevational section view, similar to FIG. 1, and showing the pilot valve of FIG. 1 shifted to an operative position from the inoperative position of FIG. 1.

FIG. 4 is a horizontal, top plan view of the pilot valve structure illustrated in FIG. 1, with parts removed, taken along the line 4—4 thereof, and looking in the direction of the arrows.

FIG. 5 is a fragmentary, elevational section view of the pilot valve structure illustrated in FIG. 1, taken along the line 5—5 thereof, and looking in the direction of the arrows.

DESCRIPTION OF THE PREFERRED EMBODIMENT

Figure 1:
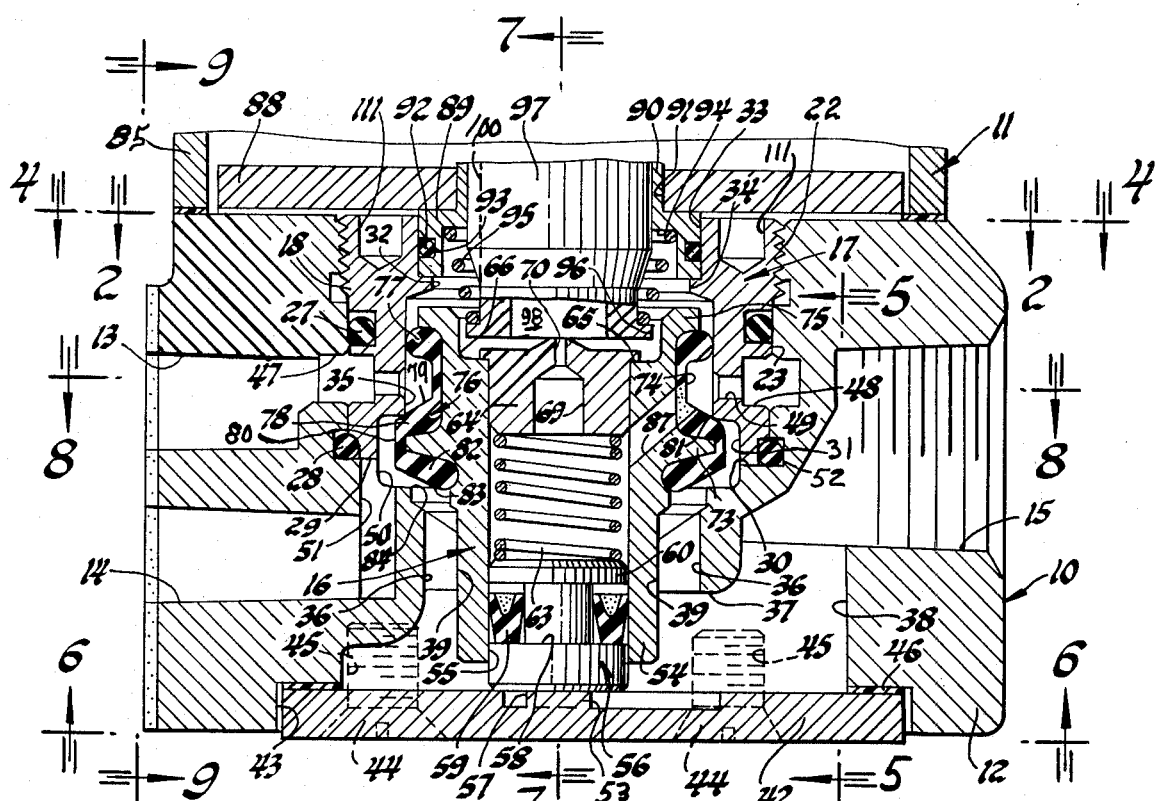
FIG. 1 is an elevational section view of a pilot operated pilot valve made in accordance with the principles of the present invention, taken along the line 1—1 of FIG. 2, looking in the direction of the arrows, and showing the valve in an inoperative position.
Figure 2:
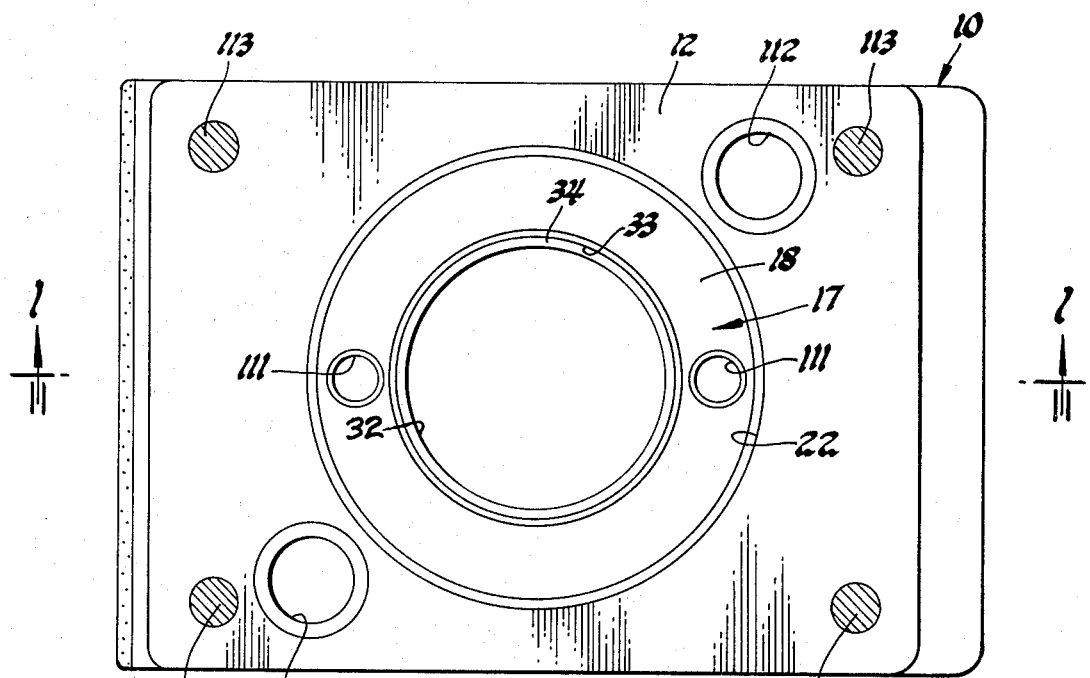
FIG. 2 is a top plan view, with parts removed, of the pilot valve structure illustrated in FIG. 1, taken along the line 2—2 thereof, and looking in the direction of the arrows.
Figure 9:
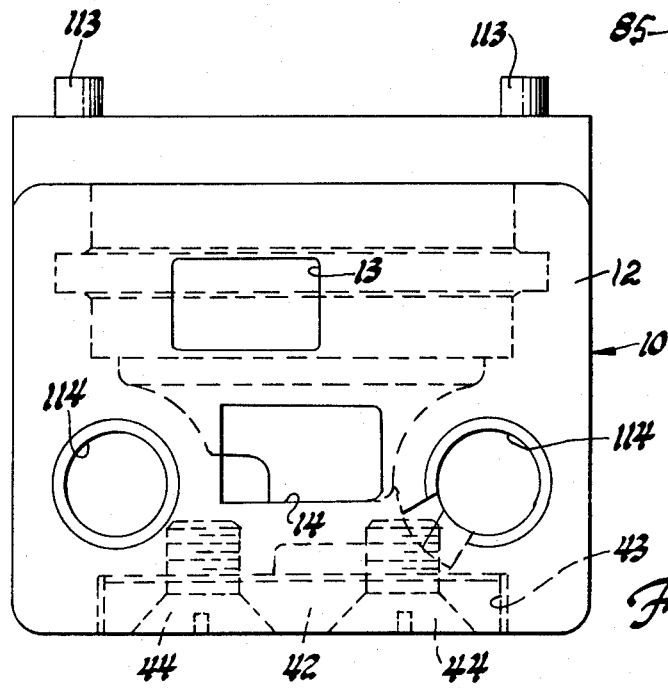
FIG. 9 is a left end view of the pilot valve structure illustrated in FIG. 1, taken along the line 9—9 thereof, and looking in the direction of the arrows.

Referring now to the drawings, and in particular to FIGS. 1 and 2, the numeral 10 generally designates a pilot operated pilot valve made in accordance with the principles of the present invention. The numeral 11 generally indicates a conventional low wattage solenoid for operating the pilot valve 10. The pilot valve 10 includes a substantially rectangular valve body 12 which is provided on one side with an inlet or supply port 13, and a cylinder port or operating port 14. As viewed in FIG. 1, the supply port 13 and the cylinder port 14 are disposed on the left side of the valve body 12, and an exhaust port 15 is provided on the right side. As shown in FIGS. 1 and 9, the supply port 13 is disposed above the cylinder port 14. As shown in FIG. 1, the pilot valve 10 includes a movable poppet spool valve, generally indicated by the numeral 16, which is disposed on an axis perpendicular to the axes of the aforementioned ports 13, 14 and 15. The poppet spool valve 16 is movably mounted within a cylindrical valve seat retainer, generally indicated by the numeral 17.

Figure 7:
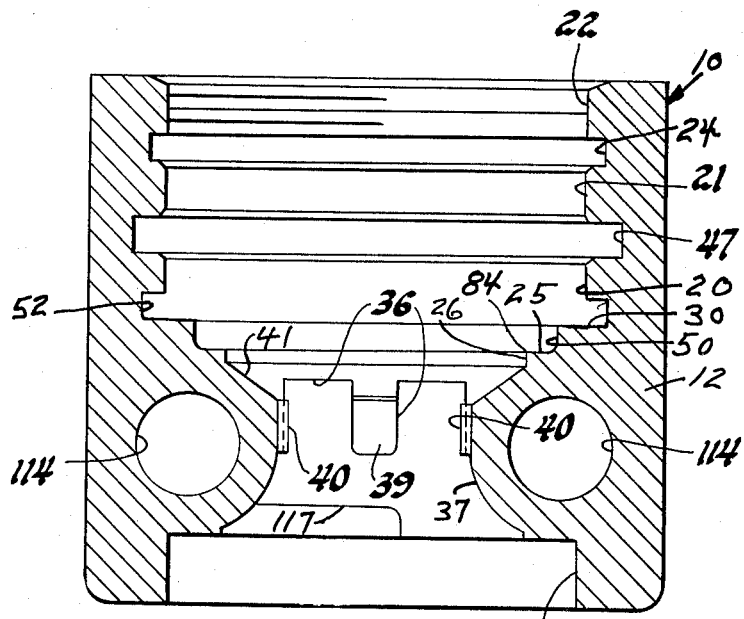
FIG. 7 is an elevational section view of the pilot valve structure illustrated in FIG. 1, with parts removed, taken along the line 7—7 thereof, and looking in the direction of the arrows.

As shown in FIGS. 1 and 2, the upper end of the valve seat retainer 17 is cylindrical, and the outer periphery thereof is threaded, and it is threadably mounted in a threaded bore 22 in the upper end of the valve body 12, perpendicular to the ports 13, 14 and 15. As shown in FIG. 7, the threaded bore 22 in the valve body 12 is axially aligned with and spaced apart from a pair of inwardly disposed unthreaded bores 21 and 20. The threaded bore 22 and the unthreaded bore 21 are spaced apart by an enlarged diameter annular groove 24. The bores 20 and 21 are spaced apart axially by an enlarged diameter annular groove 47.

As shown in FIG. 1, the valve seat retainer 17 is provided with an integral, inwardly extended portion 23 which is seated in the bore 21 (FIG. 7) in the valve body 12. The valve seat retainer portion 23 carries a suitable O-ring seal means 27 in a peripheral groove which sealingly engages the bore 21. As shown in FIG. 1, the inner transverse end of the valve seat retainer 17 is designated by the numeral 29, and it is seated on a transverse shoulder 30 formed by the junction of an enlarged diameter groove 52 in the valve body 12, and a reduced diameter bore 50. A suitable O-ring seal 28 is mounted on the shoulder 30 in an annular seat formed jointly in the outer periphery of the inner end of the valve seat retainer 17 and the groove 52.

Figure 6:
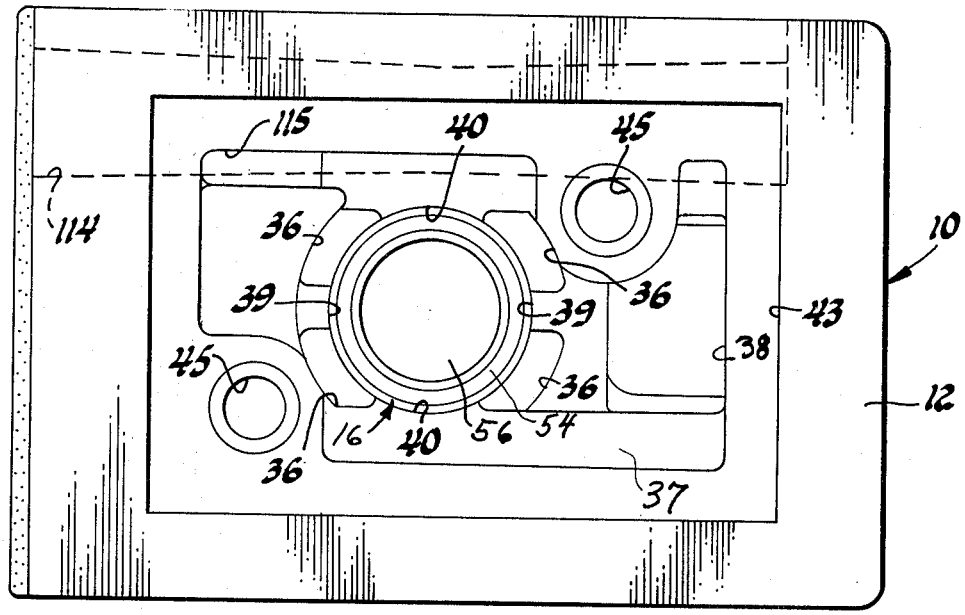
FIG. 6 is a bottom plan view of the pilot valve structure illustrated in FIG. 1, taken along the line 6—6 thereof, looking in the direction of the arrows, and with the bottom plate removed.

As shown in FIG. 7, the valve body 12 is provided with a reduced diameter bore 26 that communicates with the bore 50 to form a shoulder 25 at the junction point therebetween. The corner, at the outer end of the shoulder 25 where it meets the bore 26, comprises a valve seat 84, as explained in detail hereinafter. As shown in FIGS. 4 and 7, a downwardly sloping or tapered bore 41 commences at the inner end of the bore 26 and extends downwardly toward the lower end of the valve body 12. The tapered bore 41 has formed therethrough an irregular opening, as shown in FIG. 4, with spaced apart passages 36 that communicate with an exhaust chamber 37 in the lower end of the valve body 12 (FIGS. 1 and 7). As shown in FIG. 1, the exhaust chamber 37 communicates through the passageway 38 with the exhaust port 15. The passages 36 are spaced apart by a first pair of arcuate seats or mounting surfaces 39 which are perpendicularly spaced apart from a second pair of larger arcuate mounting seats or surfaces 40. As shown in FIG. 6, the lower end of the poppet valve 16 is slidably supported on the arcuate mounting surfaces 39 and 40 so as to form an inner wall for the four exhaust passageways 36.

As shown in FIGS. 1 and 3, the valve seat retainer 17 is provided at the upper end thereof with a bore 33 which terminates at its inner end at a reduced diameter bore 32 to form a shoulder or stop member 34. The reduced diameter bore 32 communicates with an inner, enlarged diameter bore 35 which communicates with a further enlarged diameter bore 31 formed in the inner end of the valve seat retainer 17. It is thus seen that the valve seat retainer 17 is substantially cylindrical in overall configuration with a stepped overall bore being formed therethrough. As shown in FIG. 3, the inner end bore 31 in the valve seat retainer 17 is aligned with the bore 50 in the valve body 12.

As shown in FIGS. 1 and 5, the valve body 12 is provided with an opening 43 on the lower end thereof which communicates with the exhaust chamber 37 and exhaust passageway 38. The opening 43 is enclosed by a suitable cover plate 42 and gasket 46. The cover plate 42 is secured in place in the opening 43 by suitable machine screws 44 which are mounted through the cover plate 42 and into threaded engagement in threaded holes 45 in the valve body 12.

Figure 8:
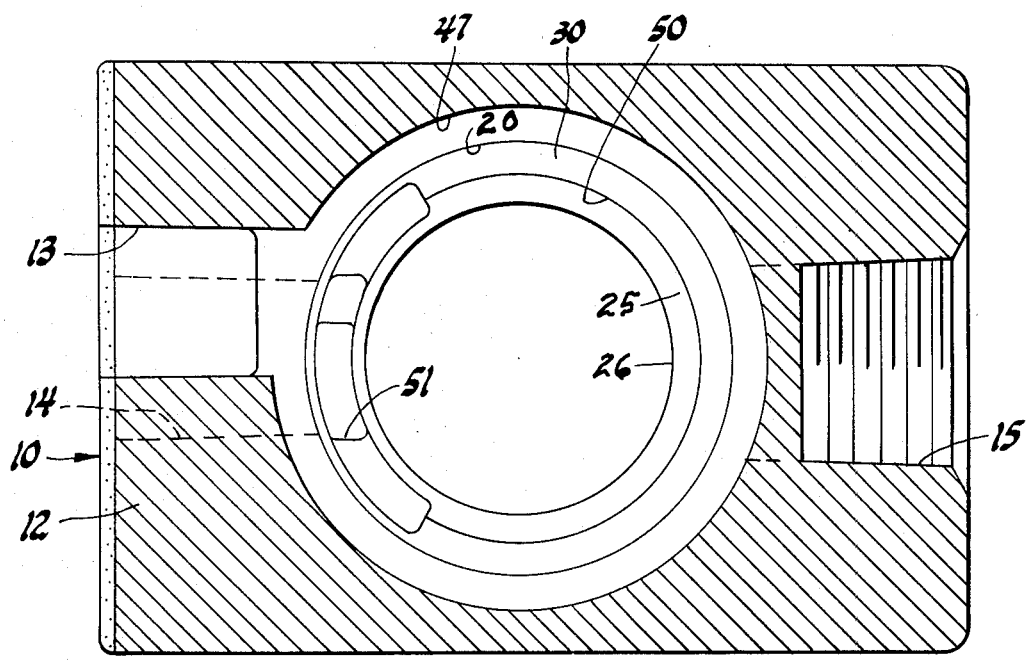
FIG. 8 is a horizontal section view, with parts removed, of the pilot valve structure illustrated in FIG. 1, taken along the line 8—8 thereof, and looking in the direction of the arrows.

As shown in FIG. 1, the inlet port 13 communicates through the annular groove 47, in the valve body 12, with an annular groove 48 formed around the outer periphery of the valve seat retainer 17. As shown in FIG. 1, the valve seat retainer groove 48 communicates through radial passageways 49 formed through the valve seat retainer 17 with the internal bore 35 in the valve seat retainer 17. As shown in FIGS. 1 and 8, the cylinder port 14 communicates through the axial passageway 51 with the bore 50 in the valve body 12 and the bore 31 (FIG. 1) in the valve seat retainer 17.

As shown in FIG. 1, the poppet spool valve 16 is cylindrical in overall configuration, and it is provided on the lower end thereof with a tubular guide shaft 54 through which is formed an axial bore 55. The poppet valve guide shaft 54 is slidably mounted over a cylindrical piston, generally indicated by the numeral 56. The piston 56 includes an annular groove 58 in which is mounted a suitable cup seal member 59.

As shown in FIG. 1, the bore 55 in the poppet spool valve 16 extends from the lower end thereof upwardly toward the upper end where it communicates with an enlarged diameter bore 66 that opens to the upper end of the poppet valve 16. A shoulder 65 is formed at the junction point between the valve bores 55 and 66. A cylindrical valve seat member 64 is mounted in the upper end of the bore 55, by any suitable means, as by a press fit, and it has a flange at the upper end thereof which is seated on the shoulder 65. A compression coil return spring 63 is operatively mounted in the bore 55 between the lower end of the valve seat member 64 and the upper end 60 of the piston 56. The spring 63 biases the piston 56 into seating engagement with the stop or seat member 53. The piston 56 is always seated on the stop member 53. A passageway 57 is formed around the stop member 53 and communicates with the exhaust chamber 37. A passageway 69 is formed in the inner end of the valve seat member 64 and it communicates with the bore 55 within the cylindrical guide shaft 54. The valve seat member 64 is provided with an axial, upwardly extended conical protrusion on its upper outer end, which has a flat upper end through which is formed a small sized axial orifice 70 that communicates with the passageway 69 and the bore 66. The upper or outer end of the orifice 70 forms a valve seat for cooperation with the armature portion 98 of the solenoid 11, as explained more fully hereinafter.

As shown in FIG. 1, the poppet spool valve 16 is provided on the upper end thereof with a pair of longitudinally spaced apart, integral, radially outward extended flanges 73 and 75. Flange 75 is formed around the upper end of the poppet spool valve 16. The flange 73 is formed about an intermediate portion. The flanges 73 and 75 form an annular groove about the outer face of the poppet spool valve 16 in which is molded, from any suitable elastomeric material, an integral valve seal and valve spool structure, generally indicated by the numeral 76. The last mentioned molded elastomeric material comprises an upper annular seal member 77 which is slidably mounted in the upper end of the valve seat retainer bore 35, and an annular valve poppet member for operation between the valve seats 81 and 84. The numeral 74 designates an annular groove between the molded annular seal member 77, and the annular molded valve poppet member which is mounted around the flange 73 and which includes the portions indicated by the numerals 78, 80 and 82.

As best seen in FIG. 3, the circular junction point between the bores 35 and 31 in the valve seat retainer 17 forms a circular edge which functions as the valve seat 81. As shown in FIG. 7, a valve seat 84 is formed by the circular junction edge between the shoulder 25 in the valve body 12 and the bore 26 in the valve body 12. Accordingly, it is seen that the valve seat 81 is formed on the valve seat retainer 17, and the valve seat 84 is formed on the valve body 12.

As shown in FIG. 1, the valve poppet portions 78 and 82 are disposed in diverging inward positions so as to form the sloping valve surfaces 79 and 83, respectively. The outer face of the inter-connecting portion of the molded spool that interconnects the spool portions 78 and 82 is provided with an annular surface 80 which is formed parallel to the bore 35 in the valve seat retainer 17. The cross section view of the annular molded poppet member forms a truncated shape, or conical shape with the pointed end removed. The annular sloping valve surfaces 79 and 83 converge as they progress radially outward, or diverge as they progress radially inward. The sloping valve surfaces 79 and 83 make a line contact with the mating valve seats 81 and 84, respectively, around the periphery of the molded poppet construction. It will be seen from FIG. 1 that when the poppet spool valve 16 is in the inoperative position shown in FIG. 1, that the sloping valve surface 79 engages the valve seat 81 to block flow from the inlet port 13 to the cylinder port 14. When the poppet spool valve 16 is moved to the operative position shown in FIG. 3, the sloping valve surface 83 engages the valve seat 84 and allows flow between the inlet port 13 and the cylinder port 14.

As shown in FIG. 1, the annular groove 74, between the annular seal member 77 and the annular valve poppet structure 76 communicates with the inlet port 13 through the valve seat retainer bore 35, the passageways 49, and the annular grooves 47 and 48, so as to convey air under pressure into the bore 55 inside of the poppet spool valve 16 to provide an air return assist to the return spring 63 for normally moving the poppet spool valve 16 upwardly into the inoperative position shown in FIG. 1. The sloping passage 87 connects the groove 74 with the bore 55 in a position above the piston 53.

Figure 10:
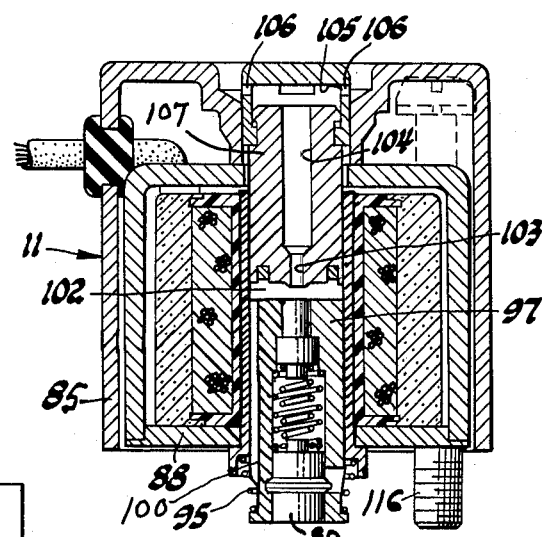
FIG. 10 is an elevational section view of a typical conventional solenoid which may be used to operate the pilot valve illustrated in FIG. 1.

When the poppet spool valve 16 is in the inoperative position shown in FIG. 1, the upper end of the valve seat member 64 is engaged by the lower end of the spring biased armature core or center member 98 (FIG. 10) of the solenoid 11 for closing the orifice 70, whereby the pilot air in the poppet valve bore 55 cannot flow through the orifice 70. The spring biased armature center member 98 is carried in the armature 97, as shown in FIG. 10. The solenoid 11 is operatively mounted on the upper end of the valve body 12. It will be understood that any conventional solenoid could be used for carrying out the following described function as well as the illustrated solenoid.

As shown in FIG. 1, the solenoid 11 includes the usual flux plate 88 which has an axial hole 91 formed therethrough in which is seated an armature guide sleeve member 90. An enlarged diameter guide sleeve 89 is formed on the lower end of the guide sleeve 90 and it is slidably received in the bore 33 in the upper end of the valve seat retainer 17. The guide sleeve 89 is provided on its outer periphery with an annular groove 93 in which is operatively mounted a suitable O-ring seal 92 for sealing engagement with the bore 33. As shown in FIG. 1, the junction point between the armature guide sleeves 90 and 89 forms an internal shoulder 94 against which is seated the upper end of a coil compression spring 95. The outer shoulder formed at the last named junction point abuts the lower face of the flux plate 88. The lower end of the spring 95 is mounted against an integral flange 96 formed on the lower end of the armature 97. It will be seen that the spring 95 functions in a conventional manner to normally bias the armature 97 downwardly to the position shown in FIGS. 1 and 10 for closing flow through the orifice 70 in the valve seat member 64.

As shown in FIG. 10, an exhaust passageway system is formed through the solenoid 11 for exhausting the chamber above the poppet spool valve 16 formed by the bore 66 and the other enclosed space between the upper end of the poppet spool valve 16 and the space around the lower end of the armature 97 when the armature 97 is in the closed position shown in FIG. 1. As best seen in FIG. 10, a vent slot 100 is formed longitudinally through the armature 97, and it communicates with a space or gap 102 between the upper end of the armature 97 and the inner end face of the fixed core member 107. The space 102 is vented to the atmosphere through the passageways 103 and 104 formed through the fixed core 107, and then into the space 105 above the core 107, and out the ports 106.

The numerals 111 in FIGS. 1 and 2 are wrench holes for a suitable wrench for threadably mounting the valve seat retainer 17 in the valve body 12. As shown in FIGS. 2 and 9, the valve body 12 is provided with suitable locating pins 113 for locating the solenoid cover 85 on the valve body 12. The holes 112 in FIG. 2 are adapted to threadably receive the solenoid attachment screws 116, which are illustrated in FIG. 10. The numerals 114 in FIGS. 6, 7 and 9 designate the mounting holes for screws for mounting the pilot operated pilot valve 10 of the present invention to the valve to be controlled by the valve 10.

In use, the pilot operated pilot valve 10 of the present invention is adapted for use in operating conventional air valves, as for example, four-way valves, three-way valves, two-way valves, and the like, which have a valve spool that is adapted to be shifted by pilot air. The valve 10 of the present invention would be connected to the valve to be controlled so that the inlet port 13 would be supplied with line air pressure, and the cylinder port or operating port 14 operatively connected by suitable passageways to the pilot end of the shiftable valve spool of the valve to be controlled.

When the valve 10 is in the position shown in FIG. 1, it will be seen that line air pressure from the valve to be controlled enters the inlet port 13 and passes through the grooves 47 and 48, and then into the radial passageways 49 and the annular groove 74 about the poppet valve 16, and then through the passage 87 into the return spring chamber inside of the poppet spool valve 16. With the solenoid 11 de-energized, the return spring 63 and the air return pressure inside of the poppet spool valve 16 urges the poppet spool valve 16 upwardly into sealing engagement with the lower end of the center portion 98 of the solenoid armature 97 to prevent flow through the orifice 70. In the inoperative position of FIG. 1, the cylinder port 14 communicates with the exhaust port 15 through the passageway 51, the bore 50, the open valve seat 84, the passages 36, the exhaust chamber 37 and passageway 38. When the solenoid 11 is energized, the armature 97 is moved upwardly against the fixed core 107 to close off exhaust flow through the core passageway 103, whereby the air under pressure inside of the poppet spool valve 16 flows through the orifice 70 into the chamber above and reacts against the effective area of the upper end of the poppet spool valve 16 and forces the poppet spool valve 16 downwardly into the operative position shown in FIG. 3.

It will be seen that when the poppet spool valve 16 is in the position shown in FIG. 3, that the line air pressure can enter through the inlet port 13 and pass through the grooves 47 and 48 into the radial passageways 49 and thence downwardly around the valve seat 81 and down through the passageway 51 and out the operating port 14. The aforementioned exhaust path between the cylinder 14 and the exhaust port 15 is closed. When the solenoid 11 is de-energized, the armature 97 is moved downwardly by the action of the return spring 95 into a position to allow the air in the chamber above the poppet spool valve 16 to be exhausted to the atmosphere through the solenoid 11, and to permit the poppet spool valve return spring 63 and the air return assist action to move the poppet spool valve 16 upwardly to the closed position shown in FIG. 1.

It will be seen that the pilot operated pilot valve 10 of the present invention functions as an amplifier in that it is possible to use the line air pressure used to operate a four-way valve, a three-way valve, a two-way valve, or the like, by a low wattage solenoid, whereby the overall valve operation can be carried out with a minimum energy, thereby conserving electrical energy.

The use of a low wattage solenoid is achieved by the fact that the orifice 70 is small, and that the solenoid armature spring 95 need only be a light duty spring to move the armature 97 downwardly to seal the small orifice 70. Accordingly, a solenoid with a low force output can be employed to carry out the function of opening and closing the orifice 70. It will also be seen that the differential areas between the top and bottom ends of the pilot spool valve 16 provides an unbalanced poppet design, whereby during a return or upward movement of the pilot spool valve 16, the exhausting air pressure passing through the exhaust chamber 37 reacts on the lower end of the pilot spool valve 16 to assist in its upward return movement.

While it will be apparent that the preferred embodiment of the invention herein disclosed is well calculated to achieve the results aforestated, it will be appreciated that the invention is susceptible to modification, variation and change.

What is claimed is:

1. A pilot operated three-way pilot valve including a valve body with a pressurized pilot air inlet port, a cylinder port, and an exhaust port, characterized in that:
   (a) a first passageway means interconnects said pilot air inlet port and said cylinder port;
   (b) a second passageway means interconnects said cylinder port and said exhaust port;
   (c) a valve spool is movably mounted in said valve body for movement between an inoperative position and an operative position so that when the valve spool is in the inoperative position it blocks the first passageway means and opens the second passageway means, and when the valve spool is in the operative position it opens the first passageway means and blocks the second passageway means;
   (d) means for normally biasing the valve spool to the inoperative position;
   (e) said means for normally biasing the valve spool to the inoperative position includes a cylindrical air return chamber formed axially through the valve spool, a piston slidably mounted in one end of the air return chamber for sealingly enclosing the same, a cylindrical valve seat member fixedly mounted in the other end of the air return chamber for enclosing the same and having a valve seat formed on the exterior side thereof and a third passageway means continuously connecting the inlet port with said air return chamber in the valve spool, a fourth small diameter orifice passageway means formed through said valve seat member for connecting the air return chamber to the valve seat and to the exterior of the valve spool, a pilot air chamber in the valve body exterior to said other end of the air return chamber in the valve spool and communicating with said fourth small diameter orifice passageway means; and,
   (f) means movably mounted in said pilot air chamber for controlling the flow of pilot air through said fourth small diameter orifice passageway means, and being movable to a first position to block air flow from said fourth small diameter orifice passageway means into said pilot air chamber and to exhaust said pilot air chamber to the atmosphere, and being movable to a second position to block flow from said pilot air chamber to the atmosphere and allow pilot air to flow through said small diameter orifice fourth passageway means and into said pilot air chamber to create an air pressure in said pilot air chamber for exerting a shifting force against the valve spool to shift it to the operative position.

2. A pilot operated pilot valve as defined in claim 1, wherein:
   (a) said means movably mounted in said pilot air chamber for controlling the flow of pilot air through said fourth passageway means comprising a solenoid operated valve means.

3. A pilot operated pilot valve as defined in either of claims 1 or 2 wherein:
   (a) said means for normally biasing the valve spool to the inoperative position includes a return spring means mounted in said air return chamber between said piston and valve seat member.

4. A pilot operated pilot valve as defined in either of claims 1 or 2 including:
   (a) a valve seat retainer member operatively mounted in said valve body with said valve spool having one end slidably mounted in the valve seat retainer, and with the pilot air chamber being formed in said valve seat retainer.

5. A pilot operated pilot valve as defined in claim 4, wherein:
   (a) said valve seat retainer has a first valve seat formed thereon which is disposed in said first passageway means, and said valve spool has a first valve element surface thereon engageable with said first valve seat when the valve spool is in the inoperative position to block air flow through said first passageway means.

6. A pilot operated pilot valve as defined in claim 5, wherein:
   (a) a second valve seat formed on said valve body which is disposed in said second passageway means, and said valve spool has a second valve element surface thereon engageable with said second valve seat when the valve spool is in the operative position to block flow through said second passageway.

7. A pilot operated pilot valve as defined in claim 6, wherein:
   (a) said first and second valve element surfaces are integrally molded on the valve spool around the periphery thereof, and said valve spool is provided with an annular seal member which sealingly engages the valve seat retainer and which is integrally molded on the valve spool with said valve element surfaces and shaped to form an annular groove about the valve spool between the annular seal member and the first valve element surface, and which groove forms a portion of said first and third passageway means.

8. A pilot operated pilot valve as defined in claim 7, wherein:
(a) said first and second valve element surfaces are longitudinally spaced apart from the valve spool and are disposed with their surfaces converging toward each other in a direction radially outward from the valve spool so that the first and second valve element surfaces are angularly disposed when they engage their respective valve seats which each comprise a sharp annular edge.

* * * * *